United States Patent [19]

Levin

[11] Patent Number: 4,806,393

[45] Date of Patent: Feb. 21, 1989

[54] PREVENTION OF PLASTICIZER MIGRATION FROM PVC PRODUCTS

[75] Inventor: Gideon Levin, Rehovot, Israel

[73] Assignee: Yeda Research and Development Company Limited, Rehovot, Israel

[21] Appl. No.: 29,582

[22] Filed: Mar. 25, 1987

[30] Foreign Application Priority Data

Mar. 30, 1986 [IL] Israel ................................. 78339

[51] Int. Cl.$^4$ ............................................. C08F 8/34
[52] U.S. Cl. ................................ 427/384; 427/393.5; 428/518; 525/331.5; 525/352
[58] Field of Search ............... 525/331.5; 428/518; 427/384, 393.5

[56] References Cited

U.S. PATENT DOCUMENTS 4,128,510 12/1978 Richwine ..................... 525/331.5
4,288,576 9/1981 Richwine ..................... 525/331.5

FOREIGN PATENT DOCUMENTS 45-38062 12/1970 Japan .
6862178 2/1979 Japan .

Primary Examiner—Joseph L. Schofer
Assistant Examiner—Bernard Lipman
Attorney, Agent, or Firm—Browdy & Neimark

[57] ABSTRACT

To plasticized polyvinyl chloride (PVC) there is applied a layer of PVC modified by the introduction of functional groups which can be crosslinked, preferably under the influence of heat. Such crosslinking provides a thin coating which prevents leakage of plasticizer and additives from the plasticized PVC substrate when it is contacted with solvents. Preferred modification of the PVC is by means of thiocarbamate moieties replacing some of the chlorine in the PVC from which the surface layer is produced.

12 Claims, 2 Drawing Sheets

PREVENTION OF PLASTICIZER MIGRATION FROM PVC PRODUCTS

FIELD OF INVENTION

The present invention relates to preventing leakage of plasticizer from PVC products; and, more particularly, to plasticized PVC products provided with a crosslinked coating which prevents plasticizer from migrating from the PVC body.

BACKGROUND

Various attempts have been made in the past to produce crosslinked PVC in order to prevent plasticizer migration. Amongst these there may be mentioned UV irradiation of a mixture of trimethylpropane trimethylacrylate (TMPTMA) with PVC resulting in a crosslinked polymer which has thermal stability and improved abrasion resistance. Also compounds such as allyl esters, trialkylacrylates, triallylisocyanurate, divinylbenzene and triacrylates have been used as crosslinking agents. When such materials are added to the entire polymer, the crosslinking results in a brittle polymer which is difficult if not impossible to mold and/or a product which is undesirably brittle.

Attempts have also been made to use a protective layer of epoxy-acrylate as a surface layer to a PVC substrate, the epoxy-acrylate being crosslinked by application of UV radiation. These attempts resulted in a layer having poor adhesion to the PVC substrate.

SUMMARY

It is an object of the present invention to overcome deficiencies in the prior art, such as mentioned above. Another object is to provide a chemically modified PVC for application to a plasticized PVC substrate as a thin surface layer to protect the PVC substrate against plasticizer and additive migration. A further object is to provide a plasticizer resistant crosslinked protective layer for PVC products.

Thus, and in accordance with the invention, a thin layer of PVC modified by the introduction of functional groups which can be crosslinked, preferably under the influence of heat, is applied to a plasticized PVC substrate to protect the plasticized PVC against plasticizer and additive migration. The chemically modified PVC surface layer is then crosslinked with the result that leakage of plasticizer and additives from the plasticized PVC substrate is substantially prevented when the substrate is contacted with liquids which would normally extract the plasticizer and/or additives.

DETAILED DESCRIPTION OF EMBODIMENTS

Figure 1:
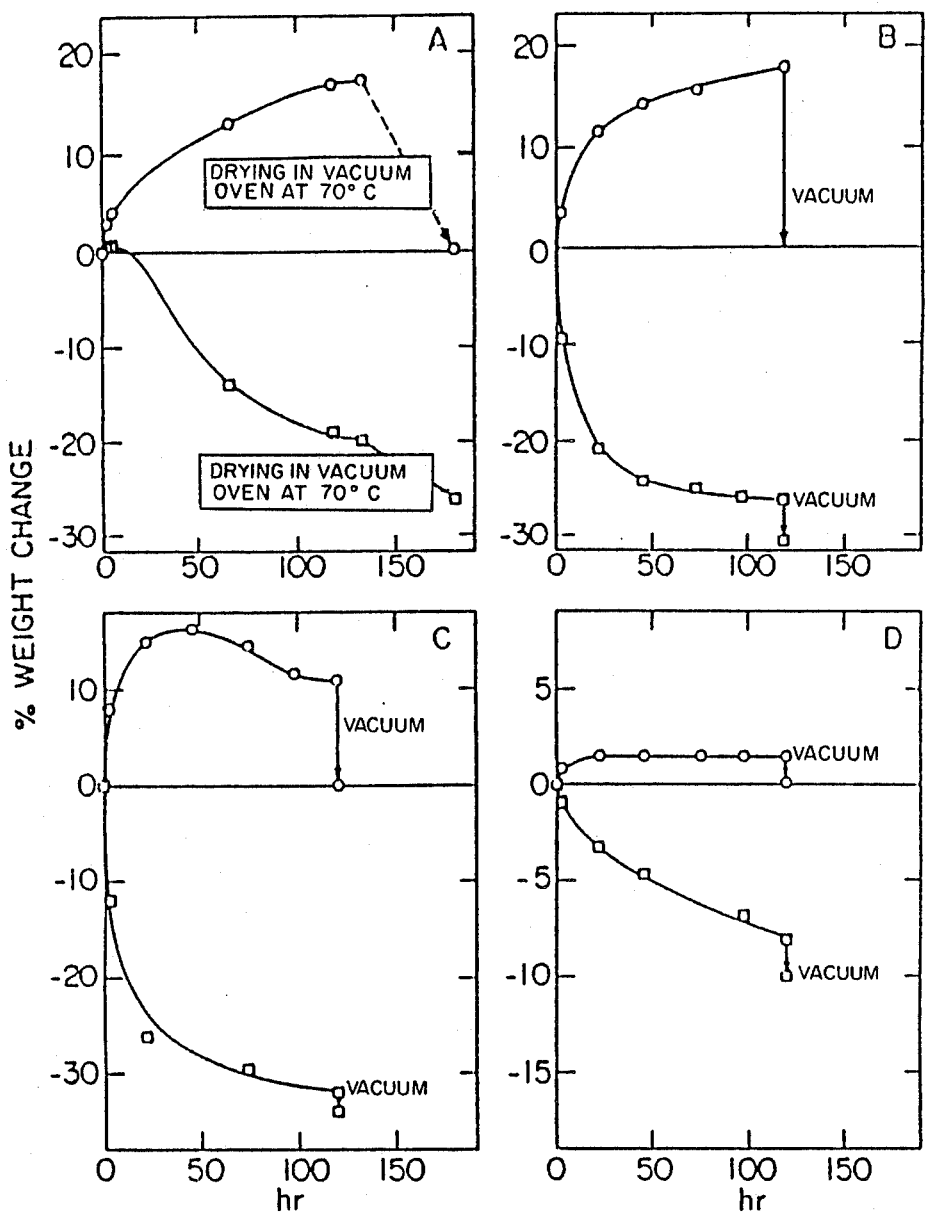
FIG. 1 comprises a series of graphs showing weight change of samples of PVC protected according to the present invention compared with unprotected samples.

According to the present invention, PVC is chemically modified by substituting, in place of at least part of the chlorine atoms, groups which are able to undergo crosslinking. The preferred substituent groups are thiocarbamate groups. Various reactants can be used to provide such substitution. One of the most suitable ones is N,N-diethyldithiocarbamate, which is a strong nucleophile and a weak base.

Temperatures of 30°–50° C. have been found satisfactory. A temperature above 50° C., the polymer undergo crosslinking reaction. The substitution of the chlorine atoms by such thiocarbamate groups can be effected in any PVC solvent or solvent system, or in an aqueous system containing organic solvent or swelling agent, preferably in an amount of 2%–100%, or in the presence of a phase transfer catalyst preferably in an amount of 0.1% up to 5% based on the polymer. Where the substitution of the chlorine atom is carried out by means of a thiocarbamate group in an organic solvent, a preferred solvent is dimethyl formamide (DMF). Where the substitution is carried out in an aqueous system, again any organic solvent or swelling agent can be used, whether water miscible or not; solvents or swelling agents which have been found satisfactory include cyclohexanone, tetrahydrofuran and dimethyl formamide, desirably at a concentration of about 10% calculated on the solid polymer. In the aqueous system the solvent acts as a swelling agent permitting the thiocarbamate reagent to penetrate into the interior of the PVC.

If a phase transfer catalyst is used in the aqueous system in place of swelling agent, the reaction which occurs is as set forth in table 1 below. Suitable phase transfer catalysts include quaternary amine salts $NR_4X^-$, phosphonium compounds, long chain polyethers such as ethylene oxide polymers, or crown ethers. As noted above, when using a phase transfer catalyst a suitable quantity is 0.1 up to 5% based on the polymer, but it should be understood that other quantities also can be used. At amounts of less than 0.1%, effectiveness becomes lessened, and at quantities above 5% the costs becomes excessive without any attendant benefit.

TABLE I

Second Order Rate Constant of Substitution Reaction on Polyvinylchloride
Solvent: D.M.F.    Temperature: 45° C.

| Nucleophile | Rate Constant $M^{-1} \cdot Sec^{-1} \cdot L \times 10^5$ |
|---|---|
| $(CH_3-CH_2)_2N-C(=S)-$, $NS^-$, $Na^+$ | 11.0 |
| morpholino-$N-C(=S)-S^-$, $Na^+$ (O(CH_2CH_2)_2N–) | 6.3 |
| $(HO-CH_2-CH_2)_2N-C(=S)-S^-$, $Na^+$ | 3.7 |
| $C_6H_5-CH_2-N(H)-C(=S)-S^-$, $Na$ | 4.2 |
| $(C_6H_5-CH_2)_2N-C(=S)-S^-$, $Na^+$ | 5.5 |

TABLE I-continued

Second Order Rate Constant of Substitution Reaction on Polyvinylchloride
Solvent: D.M.F.    Temperature: 45° C.

| Nucleophile | Rate Constant $M^{-1} \cdot Sec^{-1} \cdot L \times 10^5$ |
|---|---|
| $CH_3-(CH_2)_7-\overset{H}{\underset{|}{N}}-\overset{S}{\underset{||}{C}}-S, Na^+$ | 8.2 |

After modification of the PVC, it is used as a coating material to coat a suitably plasticized PVC polymer product or substrate. Any suitable coating method can be used including dipping, spraying, roller coating for flat substrates, etc. This is preferably effected from a solvent solution of the thiocarbamate modified PVC, although other coating systems are possible so long as the coating is effected at a temperature lower than the crosslinking temperature. Following application of the coating and drying of the solvent therefrom such as by air or vaccum drying, the coating is crosslinked by the application of heat to provide a protective layer which prevents migration of plasticizer and additives from the PVC substrate. Crosslinking is carried out at a temperature sufficiently high to effect the crosslinking reaction but not so high as to cause damage or melting of the substrate, and for a time sufficient to effect the crosslinking. Heating for half an hour at 70° C. has been found effective.

The thickness of the coating is not critical. However, the thinner the coating the better, so long as the desired protective function is achieved. A thickness as small as 30 microns has been found satisfactory.

The invention will be better and more fully understood from the following examples which are offered illustratively;

EXAMPLE 1

This is a general example of the modification of PVC to prepare a suitable PVC barrier material useful for coating on a PVC substrate. Thus, PVC of molecular weight 60,000 (0.1M) is mixed with a carbamate-containing nucleophile (0.1M) in 100 ml of DMF solvent at a temperature of 30°-50° C. In table 1 (above) there are listed suitable nucleophilic compounds and the kinetic constants of the carbamate group with the PVC in solution. The degree of substitution depends on the reactin rate; the reaction can be terminated at a predetermined degree of substitution.

EXAMPLE 2

Substitution of Chlorine by Means of Dithiocarbamate in PVC

DMF: 680 ml
PVC (Fru tarom 43): 40 g
Sodium diethyl dithiocarbamate: 55 g
Temperature: 45° C.
Duration of reaction: 6 hours The product of the reaction was precipitated by means of methanol followed by rinsing with water and methanol and drying under vacuum. There was obtained a yield of 73.6 g of a white fibrous product. Chlorine content: 22.7%, Sulfur content: 17%.

Softened PVC is coated with this product from a solvent system used for coating which is as follows:

EXAMPLE 3

Constitution of the Coating Composition for the Protective Layer

Thiocarbamate substituted PVC: 10 g
Methyl ethyl ketone: 40 g
Methyl isobutyl ketone: 40 g
Toluene: 10 g Using the composition of Example 3, a PVC substrate in the form of a film 2 to 5 mm thick is coated. The thus applied layer is dried and after removal of solvent, the coated product is inserted into a heating chamber of 70° C. for half an hour. The resultant protected layer is 30 to 40 microns thick and has a glossy look.

An improved protective layer can be obtained by adding to the above coating composition from 1 to 50%, preferably 10-30% based on the PVC, of a softening agent of plasticizer of the type which is not extractable, i.e. an internal plasticizer.

EXAMPLE 4

To the composition of Example 2, but prior to the addition of the thiocarbamate, there is added 1 to 5 grams of an internal plasticizer which may be of the type disclosed in the Levin et al U.S. Pat. No. 4,298,714, e.g. of the formula $R-(O-CH_2-CH_{2n}-S^-, Na^+$, wherein R is alkyl, phenyl or benzyl. In this case, two nucleophiles were added to the reaction mixture similar to that of Example 2 at 45° C. Thus, 10 grams of PVC-43 in 100 ml of DMF were initially provided and there were first added 30 grams of $R-(O-CH_2-CH_2-)_n-SNa$. After two hours, 20 grams of carbamate were added. The reaction proceeded as follows

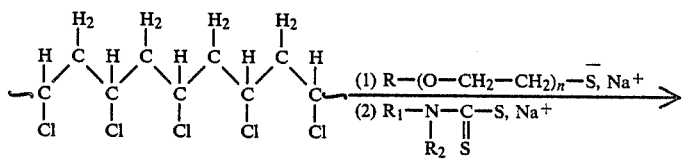

resulting in a random PVC interpolymer where the average molecule has the formula

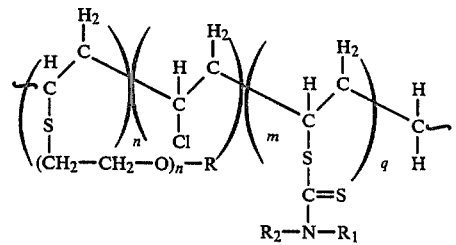

where, when m=100, m is 1-50 and preferably 10-30, and q is 1-20, preferably 1-7; R, $R_1$ and $R_2$, which may be the same or different, are any of alkyl, phenyl or benzyl. After three hours of reaction, the polymer solution was introduced into methanol where it precipitated.

EXAMPLE 5

A conventional formulation of PVC plastisol consisting of 48.8% by weight of PVC with about 32.2% of dioctylphthalate and 4.5% of dioctyladipate, with the remainder being processing aid, stabilizer, filler, dye and thioxotropic agent, was cured as a layer at about 190° C. Strips of this cured PVC polymer were coated according to the present invention and cured as indicated above. Both coated and uncoated samples were then soaked in solvent for 5-6 days. Migration of plasticizer was estimated by weighing the samples periodically. At the end of each test, residual included solvent was determined by subjecting the samples to vacuum at room temperature for tests B through D and at 70° C. for test A. The results are shown in FIG. 1, the coated sample according to the invention being designated by (0) and the uncoated samples by ( □ ). As seen in FIG. 1, the solvent served to extract plasticizer from the uncoated strips and thus the uncoated strips lost weight. In contrast, the protected strips according to the instant invention gained weight in each case because of absorption of the solvent, although when the solvent was subsequently removed at the end of each test by vacuum, each coated sample returned to its original weight.

Figure 2:
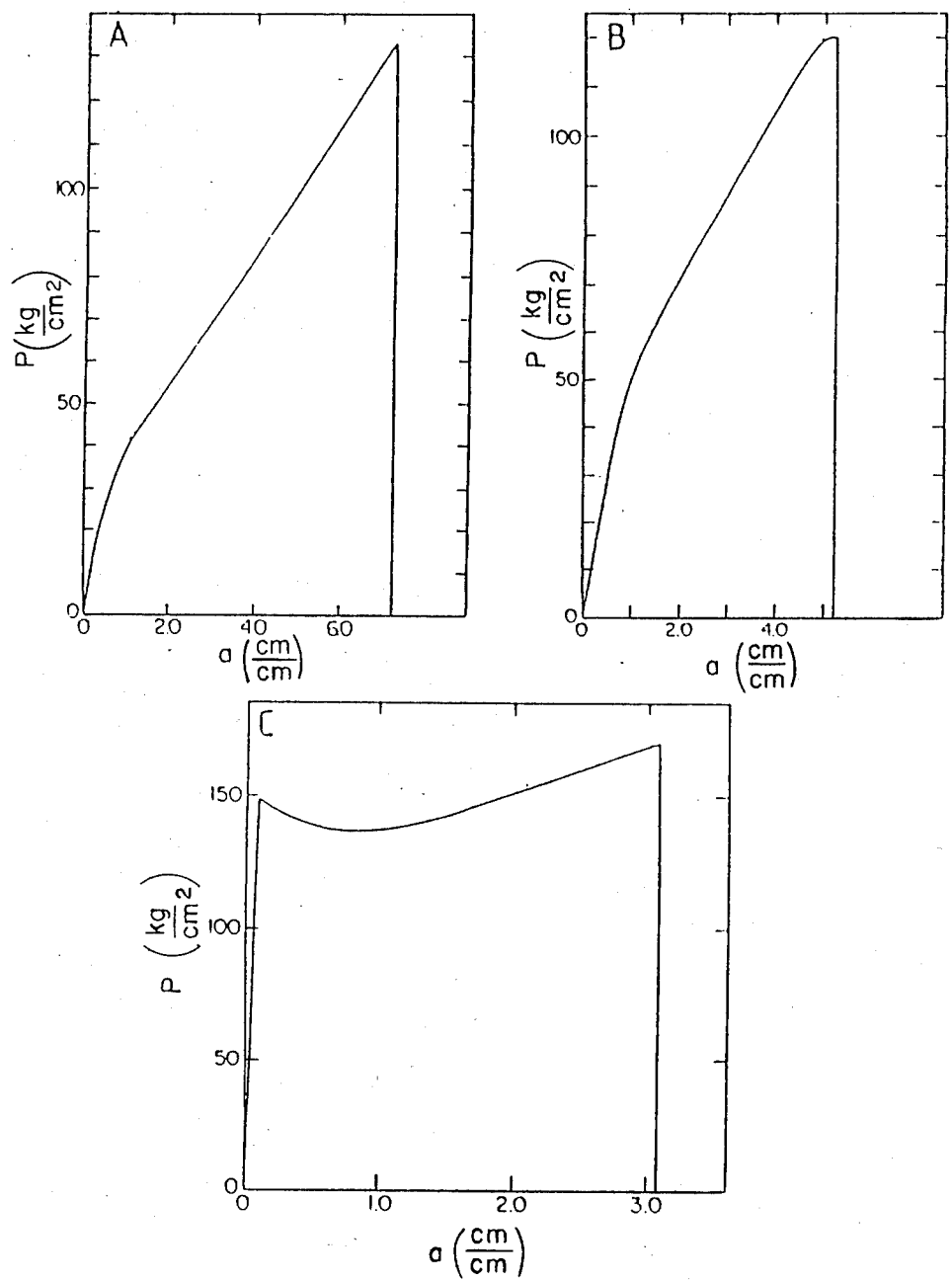
FIG. 2 shows a series of graphs comparing strength of protected and unprotected samples after soaking in a plasticizer-extracting solvent.

Coated and uncoated samples were also tested for tensile strength as a function of relative elongation, and the results are shown in FIG. 2. Graph A of FIG. 2 shows the results of plasticized, non-coated PVC. Graph B shows the strength of plasticized PVC, coated with modified polymer (22% modification) after extraction with hexane at 40° C. for 50 hours. Graph C shows the strength of plasticized non-coated PVC after extraction with hexane at 40° C. for 50 hours. Comparing graphs B and C, it is seen that the sample protected according to the present invention had an elongation of over 5.0, whereas the unprotected sample failed at an elongation of only slightly greater than 3.0.

It will be obvious to those skilled in the art that various changes may be made without departing from the scope of the invention and the invention is not to be considered limited to what is shown in the drawings and described in the specification.

What is claimed is:

1. Cross-linkable PVC, wherein a portion of chlorine atoms are substituted by dithiocarbamate groups by reaction between PVC and an N,N di-substituted dithiocarbamate.

2. Cross-linkable PVC according to claim 1, wherein the dithiocarbamate group is provided by a reagent selected from the group consisting of diethyldithiocarbamate, morpholinoethyldithio carbamate, sodium di-(B-hydroxyethyl)-dithiocarbamate, and dibenzyldithiocarbamate.

3. Cross-linkable PVC according to claim 2, wherein said reagent is N,N-diethyldithiocarbamate.

4. Cross-linkable PVC according to claim 1, wherein an average of up to 1 out of every 2 chlorine atoms is substituted by a said dithiocarbamate group.

5. Cross-linkable PVC according to claim 1, which is internally plasticized.

6. A plasticized PVC substrate having a thin coating thereon of the cross-linkable PVC of claim 1.

7. A plasticized PVC substrate having a thin coating thereon of the cross-linkable PVC of claim 5.

8. A plasticized PVC substrate having a thin cross-linked coating thereon of the cross-linkable PVC of claim 1.

9. A plasticized PVC substrate having a thin cross-linked coating thereon of the cross-linkable PVC of claim 5.

10. A process for the preparation of cross-linkable PVC, comprising reacting PVC with a reagent selected from the group consisting of diethyldithiocarbamate, morpholinoethyldithio carbamate, sodium di-(B-hydroxyethyl)-dithiocarbamate, and dibenzyldithiocarbamate at a temperature of from about 30°-50° C.

11. A process according to claim 10, wherein the reagent is N,N-diethyldithiocarbamate.

12. A process for protecting a plasticized PVC body from the migration of plasticizer therefrom, comprising coating said PVC body with a thin layer of a cross-linkable PVC according to claim 1, and cross-linking by heating.

* * * * *